March 19, 1929. M. REID 1,706,043
RIM FASTENING MEANS FOR DISK WHEELS
Filed Sept. 11, 1920 2 Sheets-Sheet 1
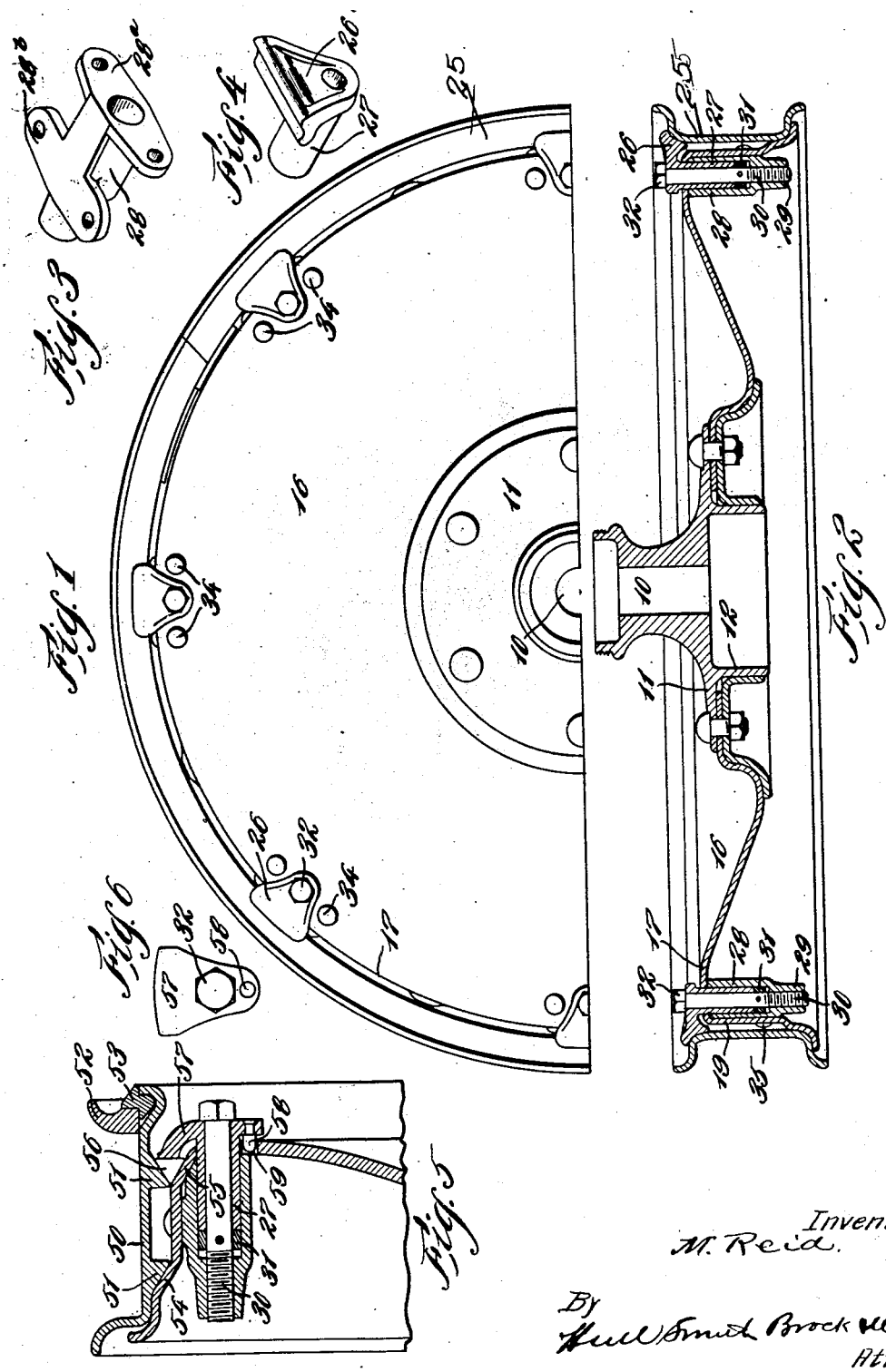
Inventor
M. Reid.
By Hull Smith Brock West
Attys.

March 19, 1929. M. REID 1,706,043
RIM FASTENING MEANS FOR DISK WHEELS
Filed Sept. 11, 1920 2 Sheets-Sheet 2
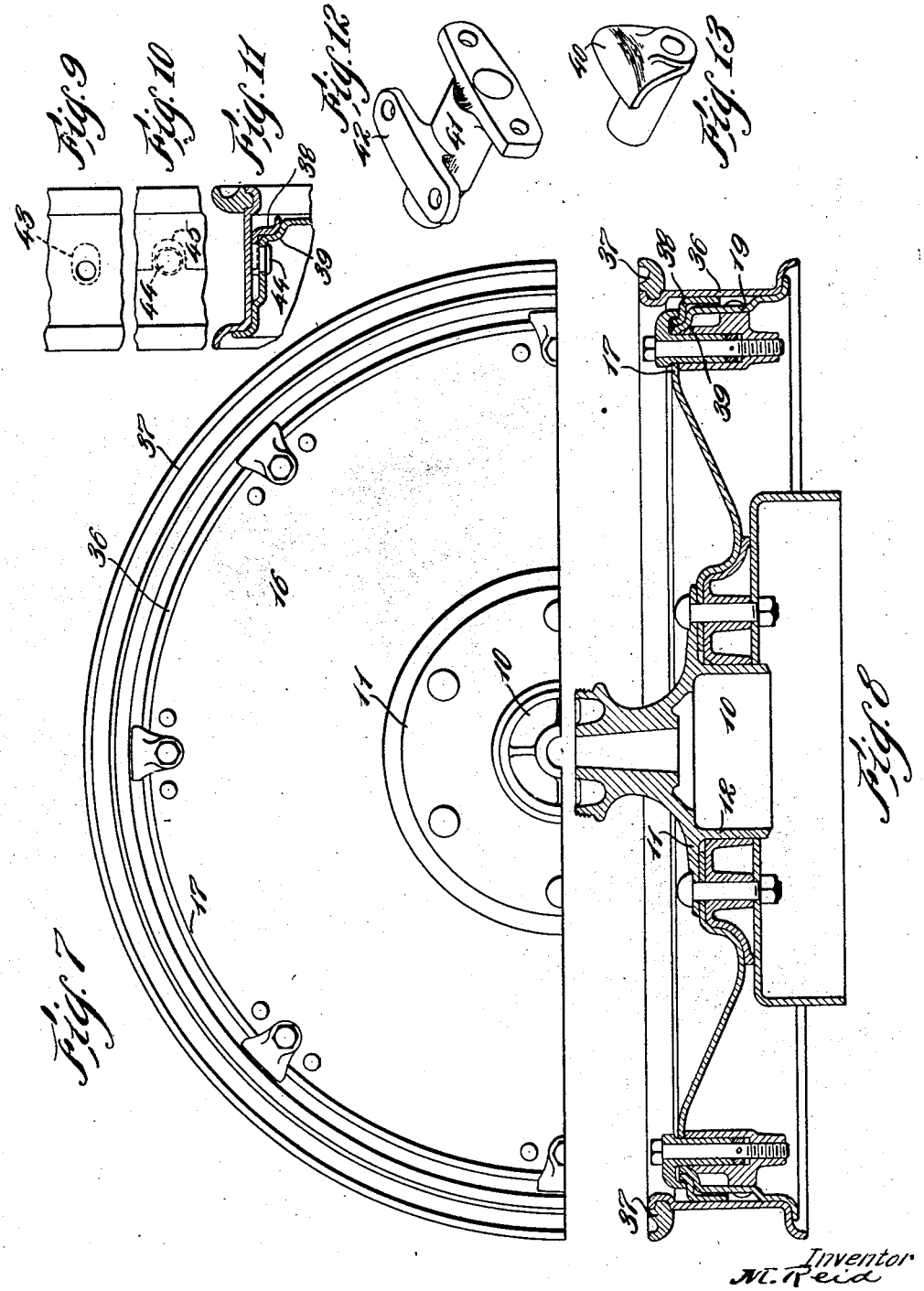

Patented Mar. 19, 1929.

1,706,043

UNITED STATES PATENT OFFICE.

MARCELLUS REID, OF CLEVELAND, OHIO.

RIM-FASTENING MEANS FOR DISK WHEELS.

Application filed September 11, 1920. Serial No. 409,652.

This invention relates generally to tire-carrying rims and means for fastening the same, and more particularly to means for fastening a demountable tire carrying rim upon the fixed rim or periphery of a sheet metal disk wheel, disclosed in my application No. 333,435 filed October 27, 1919, and of which this application is a continuation in part.

The object of the invention is to provide a novel construction of rim fastening means capable of use upon a disk wheel in connection with either a transplit tire carrying rim, or a one piece rim having a detachable ring said fastening means materially contributing to the ease and facility of mounting and demounting the tire carrying rim.

With these objects in view, and certain others which will become apparent as the description proceeds, the invention may be said to consist in the novel features of construction and combination, all of which will be fully described hereinafter and pointed out in the claims.

In the drawings forming a part of this specification, Fig. 1 is a side elevation of one half of a disk wheel having a transplit demountable tire carrying rim fastened thereon. Fig. 2 is a vertical sectional view of the same, wheel and fastening means. Fig. 3 is a detail perspective view of one part of the fastening means and Fig. 4 is a detail perspective view of the clamp member of said fastening means.

Fig. 5 is a detail sectional view of my improved fastening means, applied to one of the well known commercial rims in which a wedge ring is employed. Fig. 6 is a face view of the clamp employed in connection with said wedge ring. Fig. 7 is an elevation and Fig. 8 is a vertical section of a wheel upon which is mounted a continuous rim provided with a detachable flange ring. Fig. 9 is a detail plan view showing the valve stem hole and valve stem therein. Fig. 10 is a detail plan showing the driving connection between the rim and wheel body. Fig. 11 is a sectional view of said driving connection. Fig. 12 is a detail perspective of one part of fastening means, and Fig. 13 is a detail view of the clamp member.

The wheel body comprising the hub 10 and sheet metal disk 16 is preferably the same as disclosed in my application, filed of even date herewith, and also application 333,435 previously referred to, although it will be understood that my improved fastening means can be employed in connection with other types of disk wheels, and while the fixed rim or periphery 19 is preferably integral with the disk, it is not absolutely essential that it should be.

The transplit demountable tire-carrying rim 25 may be provided with any desired construction of the rim lock and driving lugs; and as a fastening means for this type of rim, I employ a clamp 26, which is formed with a sleeve 27, which works in a metal casting or housing 28, this casting being bored axially to receive the sleeve 27, and at its inner or rear end is internally threaded as shown at 29 to receive the threaded end of the bolt 30, said bolt passing through the sleeve 27, and is provided with a collar 31, fixed thereon, to the rear of the sleeve 27, so that when said bolt is screwed out, the collar will contact with the inner end of sleeve and force said sleeve and clamp out. When the bolt is turned in the opposite direction, its head 32 will contact with the clamp and force the same in.

The casting or housing 28 is formed with laterally projecting apertured ears $28^a$, $28^b$, respectively and by means of which said casting or housing is riveted to the face and peripheral portions of the disk wheel.

By means of the clamp having the elongated sleeve integral therewith and by having the bolt passing snugly therethrough, it is obvious that the full pull of the bolt will be had upon the clamp, and the clamp will be properly guided during its axial movements.

By screwing the bolt inwardly the clamp is forced inwardly and by moving the bolt outwardly the clamp is forced outwardly also through the medium of the collar fixed on the bolt.

The rivets for securing the casting or housing are indicated at 34 and 35 and if desired the heads of the rivets 35 can be made sufficiently large to serve as spacing buttons upon the periphery of the wheel body.

The continuous tire-carrying rim 36 shown in Fig. 8 is provided with the usual type of detachable ring 37, and upon the inner face of the base of said rim I attach an inwardly extending angular rib 38 which is adapted to seat into a rabbeted or shouldered portion 39 formed at the juncture of the flat and peripheral portions of the wheel body, and in order to securely fasten the rim to the wheel body I employ a slightly different form of clamp 40 which is adapted to engage the free end of the angled rib and force said rib into locked engagement with the shouldered or rabbeted edge of the wheel body.

The clamp is formed with the sleeve as previously described and the same type of bolt is used in connection therewith, and the sleeve of this clamp fits into the block or housing 41 which is of substantially the same construction as previously described except that the ears 42 are offset as shown in order to compensate for the shouldered portion of the wheel body. The operation of the bolt clamp and collar are the same in this construction as in the construction previously described.

43 indicates the valve stem hole which is slightly elongated in order to facilitate the placing and removal of the rim upon the wheel body, and for a driving connection I prefer to employ a stud or lug 44 which is riveted to the periphery of the wheel body and projects radially outward and is adapted to be engaged by a notched portion 45 of the angled rib which is secured to the base of the rim.

In the construction shown in Fig. 5 I have shown a tire carrying rim 50, having the inclined beads 51, said rim carrying the detachable flange 52 and locking ring 53. The periphery is inclined at 54 to meet one of the inclined beads, and at the front the periphery is inclined at 55 to receive the wedge ring 56 which engages the incline 55 and other bead and tensions the rim upon the periphery, this wedge ring being held in place by the clamp 57 which has the same sleeve 27 which works in the housing 28, and the same bolt 30 with collar 31 is employed. If desired the inner end of clamp 57 may be provided with a pin 58 to engage an opening 59 to prevent the clamp turning, but this pin is not a necessity.

It will thus be seen that I provide simple, durable, and efficient rim fastening means which are adapted for use upon disk wheels to fasten either transplit tire carrying rims or continuous rims having detachable flange rings, and the fastener can also be employed in connection with rims requiring a wedge ring as a part of the fastening means.

Having thus described by invention, what I claim is:—

1. The combination with a wheel body having a shoulder at its outer peripheral edge, of a demountable tire carrying rim having an angled rib upon the inner face of the base, adapted to engage the shouldered edge of the wheel body, clamps adapted to hold said rib in engagement with said wheel body, bolts for moving said clamps and means carried by said wheel body for receiving said clamps and bolts.

2. The combination with a fixed rim, of a demountable tire carrying rim, an inwardly extending member carried by said demountable rim, housings connected to the fixed rim, clamps having portions movable in the housings and provided with portions to engage the inwardly extending member carried by the demountable rim, and bolts passing through said clamps and engaging said housings.

In testimony whereof, I hereunto affix my signature.

MARCELLUS REID.